United States Patent [19]

Hunck et al.

[11] 4,276,896
[45] Jul. 7, 1981

[54] FLOW CONTROL VALVE ASSEMBLY WITH INTEGRATED TORQUE AND FLOW DIVIDER CONTROL

[75] Inventors: Billie G. Hunck, Cedar Falls; Robert W. Nelson, Waterloo, both of Iowa

[73] Assignee: Deere & Company, Moline, Ill.

[21] Appl. No.: 91,101

[22] Filed: Nov. 5, 1979

[51] Int. Cl.³ ............................................. F15B 13/06
[52] U.S. Cl. ...................................... 137/101; 60/424;
  60/426; 91/517; 91/518; 91/520; 137/596.16
[58] Field of Search ..................... 60/424, 426; 91/447,
  91/512, 517, 518, 520; 137/101, 596.16

[56] References Cited

U.S. PATENT DOCUMENTS

| | | | |
|---|---|---|---|
| 3,073,123 | 1/1963 | Hodgson et al. | 60/424 |
| 3,543,645 | 12/1970 | Baatrup | 91/520 X |
| 3,788,075 | 1/1974 | Holdeman et al. | 60/424 |

*Primary Examiner*—Gerald A. Michalsky

[57] ABSTRACT

A flow control valve assembly for controlling first and second reversible fluid motors for series or parallel operation has a direction control secton and a torque control section provided in a single valve body. The valve body has first, second, and third supply ports selectively pressurizeable by the direction control section and connected to a torque control bore in the torque control section. First and third function passages extend from the torque control bore and are connectible to the first fluid motor, and second and fourth function passages extend therefrom and are connectible to the second fluid motor. A grooved, torque control spool is disposed in the torque control bore for sliding from a series operating position wherein the grooves connect the first port to the first function passage, the second function passage to the third function passage, and the fourth function passage to the second and third ports. The torque control spool is biased towards a parallel operating position wherein the grooves connect the first port and the first and second function passages in parallel and connect the second and third ports respectively to the third and fourth function passages for metered flow therebetween. First and second sensing passages are fluidly connected to the second and third ports and are selectively interconnectible via a direction sensing valve in the valve body with first and second pilot passages which are respectively connected to first and second ends of the torque control bore. The direction sensing valve operates to respectively connect the first and second sensing passages to the first and second pilot passages for the first direction of operation and interchanges the connection for the second direction of operation so as to move the torque control spool to maintain equal flow of fluid to the first and second fluid motors in either direction of operation.

11 Claims, 2 Drawing Figures

FLOW CONTROL VALVE ASSEMBLY WITH INTEGRATED TORQUE AND FLOW DIVIDER CONTROL

BACKGROUND OF THE INVENTION

The present invention relates generally to flow control valve assemblies with torque control and more particularly to a flow control valve assembly with integrated torque and flow divider control.

In the past, flow control valve assemblies controlling the dual, hydrostatic wheel motors in tractor front wheel drives contained only direction and torque control sections. When limited slip differential action was required between the motors, during parallel operation, an additional flow divider valve assembly had to be added to the system.

Further, since flow divider valve assemblies normally operate in one flow direction, limited slip differential action was dispensed with for reverse operation of the fluid motors.

Still further, due to the necessary configuration of the grooving in experimental torque spools, with flow control, it was necessary to accept the situation where the flow restriction was greater with series operation than with parallel operation of the fluid motors.

SUMMARY OF THE INVENTION

The present invention provides a flow control valve assembly in which the torque control section combines the flow divider function during parallel motor operation into the same torque control spool which previously provided only the series-parallel shifting function. This is accomplished without disrupting the original function of the torque control spool and thus can be incorporated into the existing valve package envelope and can be incorporated with a minimum of new tooling.

The present invention further provides for bidirectional flow control with flow divider action by incorporating means for interchanging the connections of sensing passages to pilot passages connected to opposite ends of the torque control spool.

The present invention still further provides a torque control section in which the torque control spool permits the flow restriction for series operation to be equal to the flow restriction in parallel operation.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
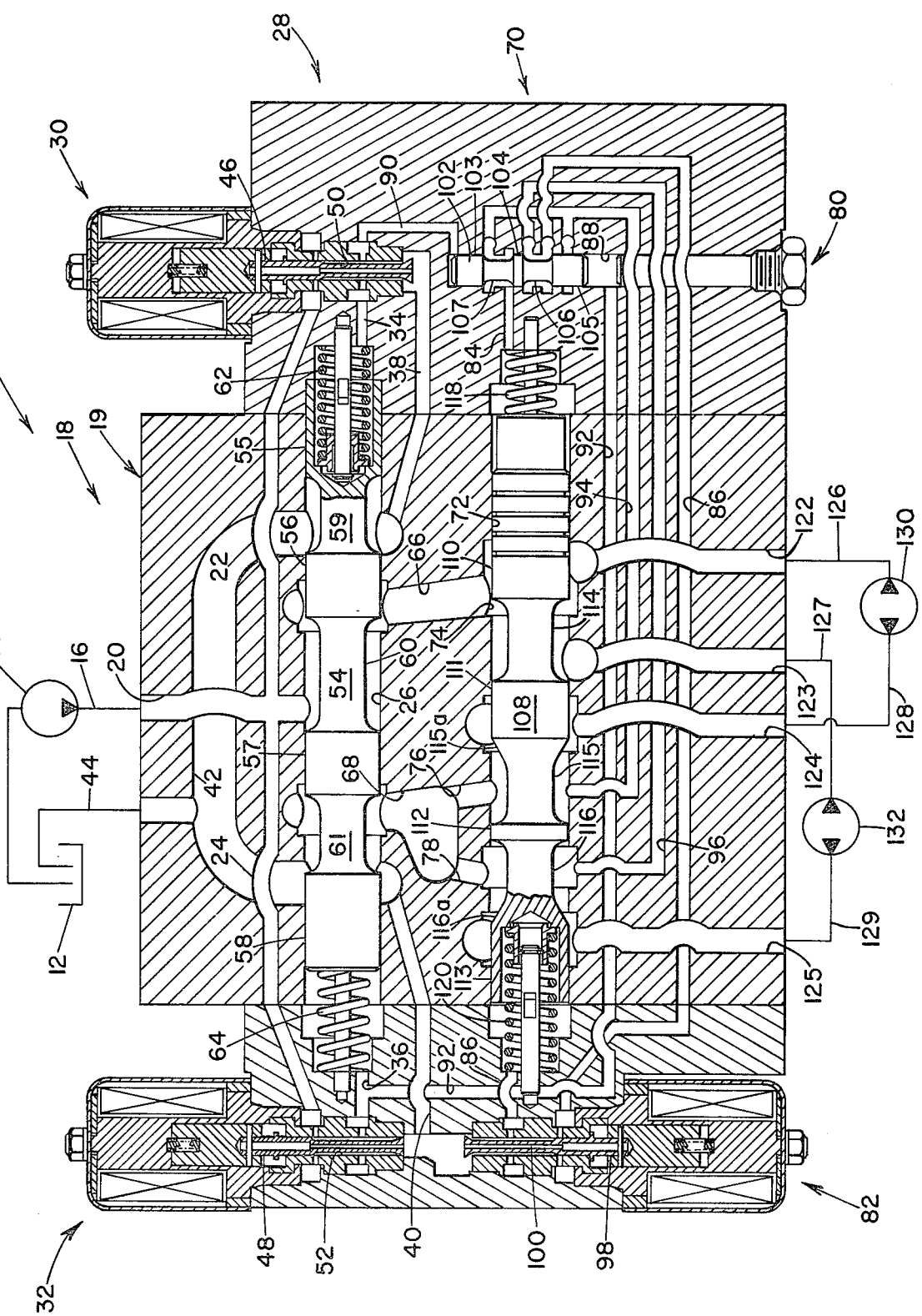
FIG. 1 is a cross-sectional view of a flow control valve assembly incorporating the present invention.

Referring now to FIG. 1, therein is shown a hydrostatic front wheel drive system 10 which incorporates a fluid reservoir 12 connected to a main pump 14 which supplies pressurized fluid through a line 16 to a flow control valve assembly 18.

The flow control valve assembly 18 is packaged in a single valve body designated by the numeral 19 which contains a main supply passage 20 to which the supply line 16 is connected. The main supply passage 20 which includes first and second pilot supply passages 22 and 24 is connected to a direction control bore 26 in the upper section of the flow control valve assembly 18 designated as the direction control section 28.

The direction control section 28 includes reverse and forward solenoids 30 and 32 which are respectively connected to the first and second pilot supply passages 22 and 24 and further respectively connected to reverse and forward pilot passages 34 and 36 which are connected respectively to first and second ends of the direction control bore 26. The reverse and forward solenoids 30 and 32 are further connected to first and second reservoir passages 38 and 40 which in turn are connected to a main reservoir passage 42 which is connected to the direction control bore 26 and returns fluid therefrom to the fluid reservoir 12 through a reservoir line 44.

The reverse and forward solenoids 30 and 32 respectively have commercially available valve stems 46 and 48 respectively slidable in commercially available valve bore elements 50 and 52 to respectively connect the first or second pilot supply passage 22 or 24 to the reverse or forward pilot passage 34 or 36 when the respective solenoid is energized, and to respectively relieve the reverse or forward pilot passage 34 or 36 respectively to the first or second reservoir passage 38 or 40 when unenergized.

Slidingly positioned in the direction control bore 26 is a direction control spool 54 which has first through fourth lands 55 through 58 which are separated by first through third grooves 59 through 61. The direction control spool 54 is spring-biased by first and second springs 62 and 64 to a position in which the second groove 60 straddles the main supply passage 20.

Extending from the direction control bore 26 are forward and reverse supply ports 66 and 68 which extend towards a section in the valve body 19 designated as the torque control section 70.

The torque control section 70 contains a torque control bore 72 which is connected to the forward supply port 66 by first function port 74 and to the reverse supply port 68 by first and second spaced apart orifice ports 76 and 78. The orifice ports 76 and 78 are sized so each has approximately one-half of the cross-sectional area of the forward supply port 66 so the flow restriction in or out of the torque control bore 72 to or from the direction control bore 26 will be equal.

The torque control section 70 includes a direction sensing valve 80 and a high torque solenoid 82 which are respectively connected to first and second ends of the torque control bore 72 by first and second pilot passages 84 and 86.

The direction sensing valve 80 includes a direction sensing bore 88 having one end connected by a reverse signal passage 90 to the reverse pilot passage 34 and a second end connected by a forward signal passage 92 to the forward pilot passage 36. The direction sensing bore 88 is connected by first and second sensing passages 94 and 96 to the torque control bore 72 respectively proximate and fluidly connected to the first and second orifice ports 76 and 78. The direction sensing bore 88 is further connected to the second pilot passage 86 which has disposed therein a commercially available valve stem 98 which is slidable in a commercially available valve bore element 100 of the high torque solenoid 82. With high torque solenoid 82 in the energized and unenergized conditions, the second end of the torque control bore 72 is respectively fluidly connected to the direction sensing bore 98 and to the reservoir passage 40.

The direction sensing valve 80 further contains a pilot spool 102 which has first through third lands 103 through 105 separated by grooves 106 and 107 to selectively interconnect the first and second sensing passages 94 and 96 respectively to the first and second pilot passages 84 and 86 or the second and first pilot passages 86 and 84.

The torque control section 70 further contains a torque control spool 108 which is slidable in the torque control bore 72. The torque control spool 108 has first through fourth lands 110 through 113 which are separated by a flow groove 114 and first and second metering grooves 115 and 116 which include first and second metering surfaces 115a and 116a, respectively. The torque control spool 108 is biased by springs 118 and 120 to a position in which the third land 112 straddles the first and second orifice ports 76 and 78 to prevent fluid communication therebetween.

Extending outwardly from the torque control bore 72 are spaced apart first through fourth function passages 122 through 125 which are respectively connected to first through fourth function lines 126 through 129. The first and third function lines 126 and 128 are connected to the ports of a first reversible fluid motor 130 which is drivable in a forward or reverse direction upon pressurization of the first or third function line 126 or 128, respectively. The second and fourth function lines 127 and 129 are connected to the ports of the second reversible fluid motor 132 which is drivable in forward or reverse upon pressurization of the second or fourth function line 127 or 129, respectively.

Figure 2:
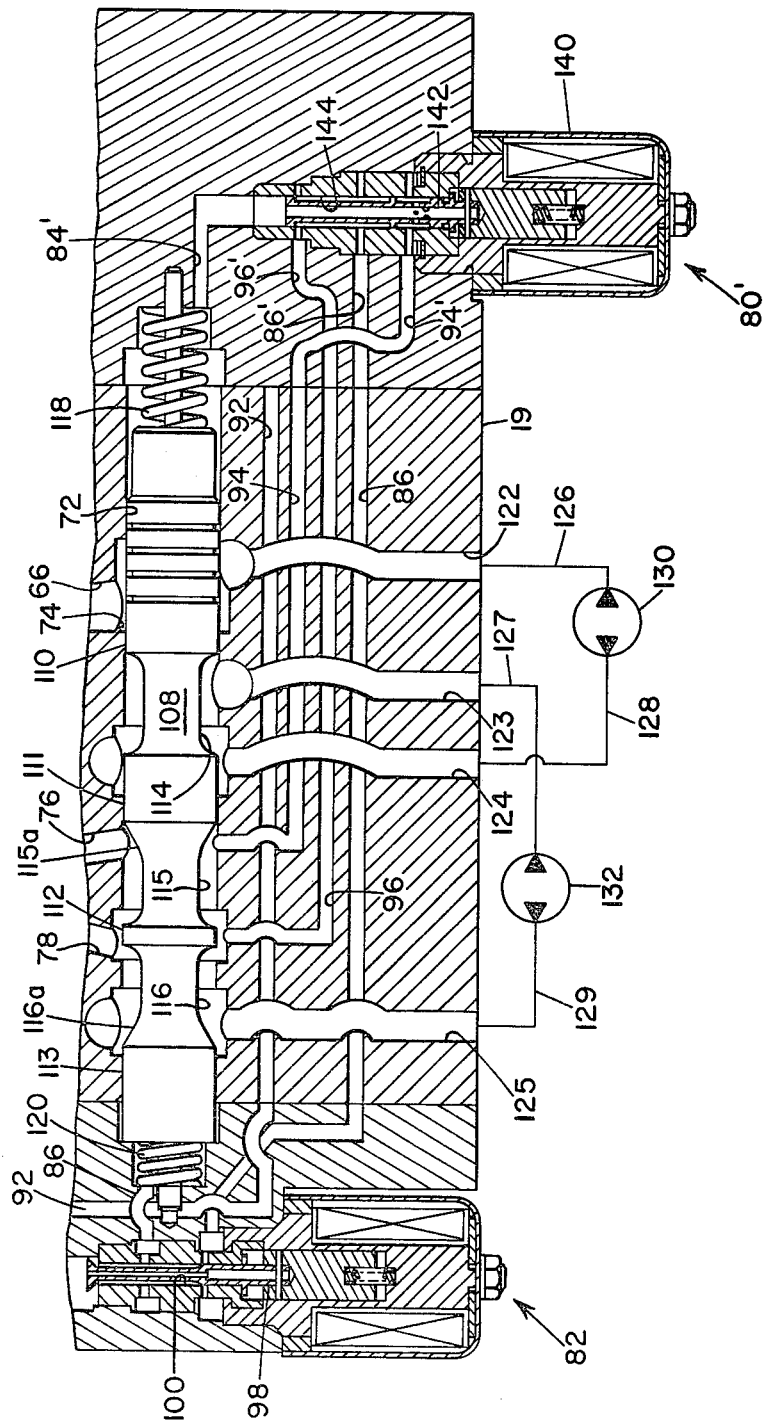
FIG. 2 is a cross-sectional view of a flow control valve assembly incorporating the present invention in an alternate embodiment.

Referring now to FIG. 2, therein is shown a modification of the torque control section 70 designated as 70' which includes a modification of the direction sensing valve 80 designated as 80'. The direction sensing valve 80' includes a direction sensing solenoid 140 having a commercially available valve spool 142 connected thereto and slidable in a commercially available valve bore element 144. The direction sensing valve 80' is unenergizable to selectively connect the first and second sensing passages 94' and 96' to the first and second pilot passages 84' and 86', respectively and in the energized condition connects the first and second sensing passages 94' and 96' to the second and first pilot passages 86' and 84', respectively. The passages 84', 86', 94', and 96' connect respectively to passage 84, 86, 94, and 96 in the remainder of the valve body 19 which is identical in both embodiments of the present invention.

Operation

The hydrostatic front wheel drive system 10 has a number of operative conditions, in addition to neutral, the first and second fluid motors 130 and 132 can be driven in either forward or reverse and can be operatively connected in series for low torque operation or in parallel when high torque at the wheels is required.

In neutral, fluid from the fluid reservoir 12 is pumped by the main pump 14 to the valve body 19 to enter the main supply passage 20 and be stopped at the second groove 60 of the direction control spool 54. With both the forward and reverse solenoids 32 and 30 unenergized, the valve stems 48 and 46, respectively, acting in the valve bore elements 52 and 50, respectively, block pressurized fluid from the forward and reverse pilot passages 36 and 34 so as to cause the springs 64 and 62 to hold the direction control spool in a main supply passage blocked position.

For forward operation in series, only the forward solenoid 32 is energized. With the forward solenoid 32 energized, the second pilot supply passage 24 is connected to the forward pilot passage 36 to urge the direction control spool 54 to a position in which pressurized fluid from the main supply passage 20 passes to the forward supply port 66 via the second groove 60 and a reverse supply port 68 is connected to the main reservoir passage 42 via the third groove 61 (as shown in FIG. 1). Initially, with no pressure at either the first or second pilot passage 84 or 86, the torque control spool 108 is in the parallel position which causes the pressurized fluid from the forward supply port 66 to be divided between the first and second function passages 122 and 123 to respectively feed the first and second fluid motors 130 and 132 in parallel and to respectively exhaust through the third and fourth function passages 124 and 125 into first and second metering grooves 115 and 116. As the pressure builds up in the first and second metering grooves 115 and 116, the fluid pressure will increase in the first and second sensing passages 94 and 96.

Since the pilot spool 102 will be in the position shown in FIG. 1 because of the pressurization of the forward passage signal 92 from the forward pilot passage 36, the pressurized fluid from the first sensing passage 94 will be connected to the first pilot passage 84 via the groove 107 to pressurize the first end of the torque control bore 72. The pressurized fluid from the second sensing passage 96 will enter the second pilot passage 86 via the second groove 106 but will be blocked from the second end of the torque control bore 72 by the valve stem 98 in the valve bore element 100 as occurs when the high torque solenoid 82 is unenergized.

With the energization of the first end of the torque control bore 72, the torque control spool 108 will be shifted to its series position compressing the spring 120. In the series position shown in FIG. 2, the first land 110 will block the forward supply port 66 from the second function passage 123 and the second land 111 will block the third function passage 124 from the reverse supply port 68, see FIG. 1.

Thus in low torque-series operation, pressurized fluid will flow from the forward supply port 66 through the first function port 74 to the first function passage 122 and the first fluid motor 130 to drive it in forward to the third function passage 124. The third function passage 124 will be connected via the flow grooves 114 to the second function passage 123. From the second function passage 123 fluid will flow to the second fluid motor 132 to drive it in forward and thence to the fourth function passage 125. From the fourth function passage 125 fluid will flow past the second metering groove 116 and the first metering groove 115 to the second and first orifice ports 78 and 76, respectively, and thence to the fluid reservoir 12.

For reverse operation in series, the reverse solenoid 30 will be energized. With the reverse solenoid 30 energized, the first pilot supply passage 22 will be connected to the reverse pilot passage 34 in order to pressurize the first end of the direction control bore 26. The first reservoir passage 38 and the main reservoir passage 42 will be disconnected at this time from the reverse pilot 34. The direction control spool 54 is shifted to a position in which the spring 64 is compressed and the second groove 60 connects the main supply passage 20 to the reverse supply port 68 and the first groove 59 connects the forward supply port 66 to the main reservoir passage 42. Pressurized fluid from the reverse supply ports 68 pressurizes the area around the first and second metering grooves 115 and 116 to cause pressurized fluid to flow into the first and second sensing passages 94 and 96. With the reverse signal passage 90 pressurized, the pilot spool 102 will slide in the direction sensing bore 88 so as to fluidly connect the second sensing passage 96 to the first pilot passage 84 and the first sensing passage 94 to the second pilot passage 86. Again, with the second sensing passage 86 blocked from the second end of the torque control bore 72, the torque control spool 108 will be shifted to compress the spring 120 and to provide pressurized fluid from the reverse supply port 68 through the second fluid motor 132, the valve body 19, and the first fluid motor 130 to the forward supply port 166 in exactly the reverse manner to that described above.

For forward high torque-parallel operation, the forward solenoid 32 and the high torque solenoid 82 are energized. With the forward solenoid 32 energized, pressurized fluid is supplied to the forward supply ports 66 and the reservoir 12 is connected to the reverse supply port 68. The pressurized fluid from the forward supply port 66 is supplied directly through the first function port 74 to the first function passage 122 and past the flow groove 114 to the second function passage 123. The pressurized fluid from the first and second function passages 122 and 123 pass in parallel to the first and second fluid motors 130 and 132, and then enter the valve body 19 at the third and fourth function passages 124 and 125, respectively. From the third and fourth function passages 124 and 125, the fluid returns to the reservoir 12 past the first and second metering surfaces 115a and 116a, respectively, and through the first and second orifice plates 76 and 78, respectively, to the reverse supply port 68.

The pressurized fluid proximate to the first and second metering grooves 115 and 116 is fed back through the first and second sensing passages 94 and 96 to the direction sensing bore 88. With the pilot spool 102 pressurized by the forward signal passage 92, the first sensing passage 94 is connected to the first pilot passage 84 and the second sensing passage 96 is connected to the second pilot passage 86. With the high torque solenoid 82 energized, the second pilot passage 86 is connected to the second end of the torque control bore 72 to provide the pressure at the second sensing passage 96 thereto.

As long as the first and second fluid motors 130 and 132 rotate at the same speed, the pressure of the fluid at the first and second metering grooves 115 and 116 will be equal causing the fluid flow into the second function passage 123 to be equal to the flow into the first function passage 122.

If one of the fluid motors suddenly speeds up because of the loss of traction at its connected wheel, the flow to that motor will be restricted and a greater flow will be provided to the other motor to limit the maximum slip permissible and provide limited slip differential action for the hydrostatic front wheel drive system 10. For example, if the first fluid motor 130 slips, the flow therethrough will increase causing a pressure increase at the first metering groove 115 which will be transmitted via the first sensing passage 94 and the first pilot passage 84 to the first end of the torque control bore 72. The increase in pressure will cause the torque control spool 108 to shift so as to reduce flow past the first metering surface 115a and increase flow past the second metering surface 116a which respectively decreases the flow through the first fluid motor 130 and increases the flow through the second fluid motor 132. When the two motors are operating again at the same speed, the torque control spool 108 will be returned to its initial position.

For reverse high torque-parallel operation, the main pump 14 is connected to the reverse supply port 68 and the fluid reservoir is connected to the forward supply port 66. The pressurized fluid is split between the first and second orifice ports 76 and 78 and thence past the first and second metering surfaces 115a and 116a, respectively to the first and second fluid motors 130 and 132, respectively, and out past the flow groove 114 and the first land 110 to the forward supply port 66. With the pressure in the first and second metering grooves 115 and 116 equal, the torque control speed 108 will be positioned so as to allow equal flow past the first and second metering surfaces 115a and 116a.

As in forward operation when one motor speeds up because of wheel slippage, the flow to that fluid motor will be increased and the flow to the other fluid motor will be decreased. For example, if the first fluid motor 130 slips in reverse, the fluid pressure at the first metering groove 115 will decrease causing a pressure decrease to the first sensing passage 94 to the second pilot passage 86 via the groove 106 in the pilot spool 102. This will cause the pressurized fluid in the first end of the torque control bore 72 to shift the torque control spool 108 to decrease the flow past the first metering surface 115a and to increase the flow past the second metering surface 116a. When the two fluid motors are again operating at the same speed, the torque control spool 108 will again be positioned to provide equal flow past first and second metering surfaces 115a and 116a.

In the alternate embodiment shown in part in FIG. 2, the flow control valve assembly operates in generally the same manner with the exception that the interconnections between the first and second sensing passages 94' and 96' and the first and second pilot passages 84' and 86' are changed by the direction sensing valve 80'. For operation in the forward direction when the forward solenoid 32 is energized, the solenoid 140 is unenergized and the valve spool 142 is positioned in the valve bore element 144 so as to connect the first and second sensing passages 94' and 96' respectively to the first and second pilot passages 84' and 86'. When the reverse solenoid is energized, the solenoid 140 is also energized so as to interconnect the first and second sensing passages 94' and 96' respectively to the second and first pilot passages 86' and 84'.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A flow control valve comprising: a valve body having a bore provided therein having a first and a second closed end; said valve body having first and second pilot passages provided therein respectively connected to the first and second closed ends of the bore; said valve body having first, second, and third ports provided therein spaced apart and connected to the bore; said valve body having a first function passage provided therein fluidly connected to the first port; said valve body having second, third, and fourth function passages provided therein spaced apart and connected to the bore proximate the first function passage; said valve body having first and second sensing passages provided therein respectively fluidly connected to the second and third ports; control means disposed in the valve body connected to the second pilot passage for selectively relieving fluid pressure in the second closed end of the bore; spool means disposed in the bore blocking the first closed end thereof from the second closed end and slidable between a first and a second position; said spool means having groove means provided therein for metering the flow of fluid between the second port and the third function passage and between the third port and the fourth function passage in the first position, and for connecting the second function passage to the third function passage and the second and third ports to the fourth function passage in the second position; said spool means including land means for blocking the second function passage from the third function passage and the second port from the third port in the first position and for blocking the first port from the second function passage and the second port from the third function passage in the second position; and direction sensing valve means provided in the valve body for fluidly connecting the first and second sensing passages to the first and second pilot passages, respectively.

2. The flow control valve as claimed in claim 1 wherein the first, second, and third ports have respective first, second, and third cross-sectional areas and the first cross-sectional area is approximately equal to the sum of the second and third cross-sectional areas.

3. The flow control valve as claimed in claim 1 wherein the direction sensing valve means includes means for selectively connecting the first and second sensing passages to the second and first pilot passages, respectively.

4. A flow control valve comprising: a valve body having a torque control bore provided therein having a first and a second closed end; said valve body having first and second pilot passages provided therein respectively connected to the first and second closed ends of the torque control bore; said valve body having first, second, and third ports provided therein connected to the torque control bore respectively distal from the first closed end of the bore; said valve body having a first function passage provided therein fluidly connected to the first port; said valve body having second, third, and fourth function passages provided therein connected to the torque control bore distal from the first closed end in a spaced relationship; said valve body having first and second second sensing passages provided therein respectively fluidly connected proximate to the second and third ports; said valve body having a direction sensing bore provided therein having a first and a second end, said direction sensing bore having the first and second sensing passages and the first and second pilot passages connected thereto; torque control means disposed in the valve body connected to the second pilot passage for selectively relieving fluid pressure in the second closed end of the torque control bore; a torque control spool disposed in the torque control bore blocking the first closed end thereof from the second closed end and slidable between a first and a second position; said torque control spool having first, second, and third groove means provided therein, said first groove means for controlling the flow of fluid between the first port and the second function passage in the first position and for fluidly connecting the second and third function passages in the second position; said second groove means for metering the flow of fluid between the second port and the third function passage in the first position and for fluidly connecting the second port and the fourth function passage in the second position, and said third groove means for metering the flow of fluid between the third port and the fourth function passage in the first position and for fluidly connecting the third port and the fourth function passage in the second position; said torque control spool having second and third land means, said second land means blocking fluid flow between the second and third function passages in the first position and blocking fluid flow between the third function passage and the second port in the second position, and said third land means blocking fluid flow between the second and third ports in the first position; a valve spool disposed in said direction sensing bore for fluidly connecting the first and second sensing passages to the first and second pilot passages, respectively, in a first location.

5. The first flow control valve as claimed in claim 4 wherein the first, second and third ports have first, second, and third cross-sectional areas and the first cross-sectional area is equal to the sum of the second and third cross-sectional areas.

6. The flow control valve as claimed in claim 4 wherein said valve body has forward and reverse signal passages provided threin, said forward signal passage fluidly connecting said reverse pilot passage to said first end of said direction sensing bore an said reverse signal passage fluidly connecting said forward pilot passage to said second end of said direction sensing bore, and said valve spool is slidable in said direction sensing bore to a second location and has means provided therein for fluidly connecting the first and second sensing passages to the second and first pilot passages, respectively, in the second location.

7. The flow control valve as claimed in claim 4 wherein said valve spool is slidable to a second location and has means provided therein for fluidly connecting the first and second sensing passages to the second and first pilot passages, respectively, in the second location and including actuator means connected to the valve spool operable to slide the valve spool in said direction sensing bore.

8. In a flow control valve assembly including a valve body having a direction control bore provided therein having a forward and a reverse end; said valve body having spaced apart supply, exhaust, forward supply, and reverse supply ports provided therein connected to said direction control bore, said supply port connectible to a source of pressurized fluid and said exhaust port connectible to a fluid reservoir; forward and reverse actuator means respectively connected to the forward and reverse ends of the direction control bore and to the supply and exhaust ports operative to change a normal connection of the forward or reverse end to the exhaust port to a connection to the supply port; a direction control spool slidably disposed in the direction control bore blocking the forward end thereof from the reverse end and slidable between a forward and a reverse operation position; said direction control spool including groove means for respectively connecting the supply and exhaust ports to the forward and reverse ports in the forward operation position and for respectively connecting the supply and exhaust ports to the reverse and forward ports in the reverse operation position; said valve body having a torque control bore provided therein having a first and a second end; said valve body having spaced apart first, second, third, and fourth function passages provided therein connected to the torque control bore, said first and third function passages connectible to ports of a first reversible fluid motor and said second and fourth function passages connectible to ports of a second reversible fluid motor; the improvement comprising: said valve body having spaced apart first, second, and third ports provided therein, said first port connecting the forward supply port and the torque control bore, and said second and third ports connecting the reverse supply port and the torque control bore; said valve body having a direction sensing bore provided therein having a first and a second end; said valve body having first and second sensing passages provided therein connected to the torque control bore respectively, proximate the second and third ports and to the direction sensing bore respectively proximate the second end thereof; said valve body having first and second pilot passages provided therein respectively connected to the first and second ends of the torque control bore and respectively connected to the direction sensing bore adjacent the first and second sensing passages; torque actuator means disposed in the second pilot passage and connected to the exhaust port operative to change the normal connection of the second pilot passage to the exhaust port to a through connection therethrough; a torque control spool disposed in the torque control bore blocking the first closed end thereof from the second closed end and slidable between a first and a second position; said torque control spool having first, second, and third groove means provided therein, said first groove means for controlling the flow of fluid between the first port and the secnd function passage in the first position and for fluidly connecting the second and third function passages in the second position, said second groove means for metering the flow of fluid between the second port and the third function passage in the first position and for fluidly connecting the second port and the fourth function passage in the second position, and said third groove means for metering the flow of fluid between the third port and the fourth function passage in the first position and for fluidly connecting the third port and and the fourth function passage in the second position; said torque control spool having second and third land means, said second land means blocking fluid flow between the second and third function passages in the first position and blocking fluid flow between the third function passage and the second port in the second position, and said third land means blocking fluid flow between the second and third ports in the first position; and a valve spool disposed in said direction sensing bore and slidable between a forward and a reverse sensing position; said valve spool including means for fluidly connecting, the first and second pilot passages to the first and second sensing passages, respectively, in the forward sensing position and for fluidly connecting the first and second pilot passages to the second and first sensing passages, respectively, in the reverse sensing position.

9. The flow control valve as claimed in claim 8 wherein the first, second, and third ports have respective first, second, and third cross-sectional areas and the first cross-sectional area is equal to the sum of the second and third cross-sectional areas.

10. The improvement as claimed in claim 8 wherein said valve body has forward and reverse signal passages provided therein respectively fluidly connecting the first and second ends of the direction sensing bore to the forward and reverse ends of the direction control bore.

11. The improvement as claimed in claim 8 including spool actuator means connected to the valve spool operable to slide the valve spool from the first end to the second end of the direction control bore.

* * * * *

UNITED STATES PATENT AND TRADEMARK OFFICE
CERTIFICATE OF CORRECTION

PATENT NO. : 4,276,896
DATED : 7 July 1981
INVENTOR(S) : Billie G. Hunck and Robert W. Nelson It is certified that error appears in the above—identified patent and that said Letters Patent is hereby corrected as shown below:

Column 7, line 55, delete "second" first occurrence.

Column 8, line 25, delete "first"; line 32, delete "threin" and insert -- therein --; line 34, delete "an" and insert -- and --.

Column 9, line 38, delete "secnd" and insert -- second --.

Column 10, line 8, delete "and" first occurrence.

Signed and Sealed this

Twenth-eighth Day of September 1982

[SEAL]

Attest:

GERALD J. MOSSINGHOFF

*Attesting Officer*     *Commissioner of Patents and Trademarks*